United States Patent [19]

Suzuki

[11] Patent Number: 5,029,152
[45] Date of Patent: Jul. 2, 1991

[54] APPARATUS FOR DETECTING DELETE PATTERNS OF OPTICAL DISCS

[75] Inventor: Hiroshi Suzuki, Odawara, Japan

[73] Assignee: Hitachi, Ltd., Tokyo, Japan

[21] Appl. No.: 312,972

[22] Filed: Feb. 21, 1989

[30] Foreign Application Priority Data

Feb. 22, 1988 [JP] Japan .................................. 63-37438

[51] Int. Cl.$^5$ ........................... G11B 7/00; H04B 9/00; H04N 5/84
[52] U.S. Cl. ...................................... 369/59; 369/58; 369/56; 369/100; 369/116
[58] Field of Search .................... 369/59, 100, 58, 124, 369/47, 49, 56; 358/83

[56] References Cited

U.S. PATENT DOCUMENTS 4,881,215 11/1989 Horie .................................... 369/54

OTHER PUBLICATIONS

"Explanatory Note on the Sector Format for Continuous Servo Method", Jun. 1987, Continuous Servo Working Group in Japan.

Primary Examiner—Roy N. Envall, Jr.
Assistant Examiner—Hindi Nabil
Attorney, Agent, or Firm—Fay, Sharpe, Beall, Fagan, Minnich & McKee

[57] ABSTRACT

A circuit for detecting delete patterns of an optical disc, the delete pattern overwriting data on a sector of an optical disc to delete previously written data of the sector, the delete pattern having a predetermined pulse width, period and number of pulses. The read-out signal from the sector is digitized with a predetermined slice level. The delete pattern is detected from the digitized signal by measuring pulse width to determine if the delete pulse width is present, by measuring the period between the pulses to determine if the delete period is present, and by measuring the number of pulses to determine if the delete number of pulses is present. According to one or more of these determinations, the delete state of the sector may be detected. The false delete state caused by dust, etc., distorting the read analog signal is detected by providing a peak pulse signal from the read-out analog signal and the data signal, and interleaving this peak pulse signal with the digital signal to produce a combined signal fed to the various detectors for determining one or more of the pulse width, period, and number, so that the delete pattern and thereby the delete state may be detected in a highly reliable manner to prevent the erroneous detection of false delete patterns that are produced by valid data.

20 Claims, 7 Drawing Sheets

APPARATUS FOR DETECTING DELETE PATTERNS OF OPTICAL DISCS

BACKGROUND OF THE INVENTION

The present invention relates to a circuit for detecting the delete patterns of an optical disc, and more particularly to a delete pattern detecting circuit suitable for detecting delete patterns in an optical disc of the WORM (write once read many) type device.

In the optical disc recording device, generally speaking, data is recorded by forming holes or pits in a track of the disc. However, the data that has once been thus formed cannot physically be eliminated or erased when it is desired to present new data, unlike magnetic disc memory systems. In the WORM type optical disc device, generally speaking, new data must be written in new data areas that have not been used previously for writing data. On the other hand, previously written data that is no longer desired, can be effectively deleted by overwriting delete patterns of long pits over top of the unnecessary recorded data pits, so that the delete pattern can be recognized from the ordinary data.

In the past, the formatting of optical discs have included a delete flag, wherein the delete flag is set whenever it is desired to delete the data in the sector corresponding to the delete flag. However, this delete flag is of short length, for example 1 bit, and therefore easily affected by dust and the like to falsely produce a delete signal so that valid data is falsely considered deleted. The previously described delete patterns represent an improvement over the delete flag in that the patterns are longer and less susceptible to false reading.

A system for performing such delete patterns is disclosed according to a document entitled "Explanatory Note On The Sector Format For Continuous Servo Method", June 1987, Continuous Servo working Group in Japan. Accordingly, the data recorded in an optical disc is deleted by providing overriding long pits or delete patterns other than the data recorded pattern on top of unwanted previously written data, for a constant period of time.

SUMMARY

According to the above mentioned delete pattern, it can be decided whether or not sectors have been deleted according to whether or not they contain the delete pattern. This determination of the delete state of a sector, according to detecting delete patterns, can be accomplished by digitizing the analog signals read from the optical discs, by detecting the pulse width, period between the pulses of the delete width and the number of such periods of the delete patterns, and by examining whether or not these detected values satisfy fixed reference values corresponding to the delete patterns to determine the delete state. Width may refer to the time of a high pulse or the time of a low pulse, and period may refer to the time between low states or high states.

Due to various reasons, there can be the problem that valid data may falsely produce a delete pattern, and it is an object of the present invention to reliably determine that delete state by detecting the delete pattern and distinguishing it from such false delete patterns that may be produced by valid data.

The circuit detects delete patterns, of an optical disc, that provides overwriting a delete pattern on a sector of an optical disc to delete previously written data of the sector, the delete pattern having a predetermined pulse width, period and number of pulses. The read-out signal from the sector is digitized with a fixed slice level, which may be varied. The delete pattern is detected from the digitized signal by one or more of measuring pulse width to determine if the delete pulse width is present, measuring the period between the pulses to determine if the delete period is present, and measuring the number of pulses or periods to determine if the delete number of pulses is present. According to one or more of these determinations, the delete state of the sector may be detected. The false delete state is detected by providing a peak pulse signal from the read-out analog signal and interleaving this peak pulse signal with the digital signal to produce a combined signal fed to the various detectors for determining one or more of the pulse width, period, and number, so that the delete pattern and thereby the delete state may be detected in a highly reliable manner to prevent the erroneous detection of false delete patterns that are produced by valid data.

BRIEF DESCRIPTION OF THE DRAWINGS

Further objects, features and advantage of the present invention will become more clear from the following detailed description of a preferred embodiment, show in the accompanying drawing wherein.

DETAILED DESCRIPTION OF THE PREFERRED EMBODIMENT

Figure 2:
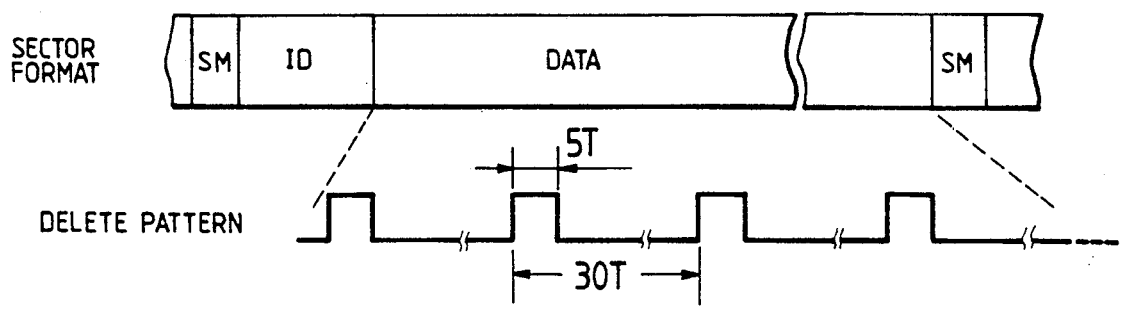
FIG. 2 is a diagram showing the sector format and the pattern used in the apparatus of the present invention.

FIG. 2 discloses the sector format employed with the embodiment of the present invention together with a delete pattern that is employed with the embodiment of the present invention. In a known manner, the optical disc is formed with spirals of grooves to define a plurality of generally concentric tracks on the optical disc, with each track being divided into a plurality of sectors. As shown in FIG. 2, each sector of the optical disc is composed of a sector mark field SM, an ID code field, and a following data portion or field DATA. The data portion has a length of 1,360 bytes, for example. Data is written on a sector once on the data portion of the sector. Once it has been determined that the data is no longer necessary, that is when the data is to be invalidated, the data is deleted by deleting the entire sector. For the sector to be deleted, a delete pattern having the pattern of pulses indicated in FIG. 2 is overwritten onto the data within the data portion of the sector format. By way of an example, the delete pattern may be overwritten onto 80% or more of the data portion only. In the delete pattern, one bit period is designated T and it is therefore seen that the pulse width of the delete pattern is 5T and the period between pulses is 30T, for example.

An analysis of the potential problems with such a delete pattern system indicating a deleted sector is a part of the present invention. There can occur the situation wherein valid data may be read and digitized into a false delete pattern that would falsely indicate the delete state of the sector, when in fact the valid data only exists in the data portion of the sector. This false delete pattern may be produced by distortion in the analog signal due to reasons, which may include; dust on the optical disc, including dust in the data pits, dust between data pits, and dust between the tracks, which dust changes the reflection of the optical disc and therefore produces a false wave form for the analog read signal; a defective optical disc that will produce an inaccurate analog wave form; and a degradation of the resolution, which may be the result of a difference in resolution of the head, a difference in resolution between an inner and outer portion of the disc, or resolution problems relating to the material of the optical disc, or data pit sizes even of the same disc. For these various reasons, valid data patterns can produce a distorted analog read signal that can be digitized into a false delete pattern, which could be falsely determined as a delete pattern and delete state for the sector despite the fact that the sector contains only valid data not intended to be deleted.

Figure 3:
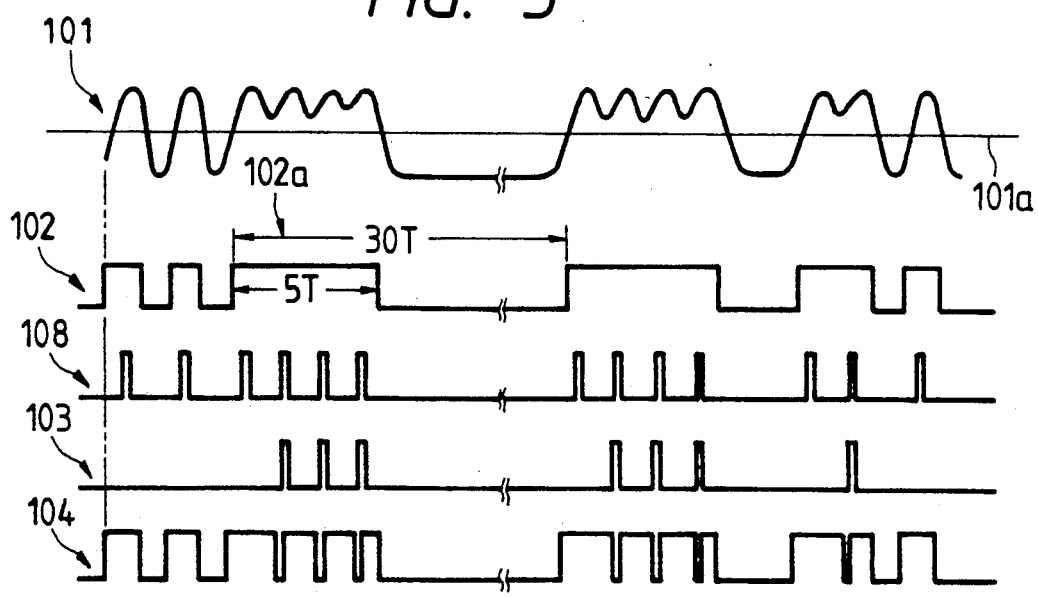
FIG. 3 is a chart of waveforms provided by the various circuit portions of the apparatus according to FIG. 1.

The above identified problem could be understood with greater clarity with reference to FIG. 3. The read signal 101 from the optical disc will be in analog form. This read signal 101 is digitized into a digital signal 102 with reference to the slice level 101a. More specifically, any portion of the analog signal 101 that extends aboVe the slice level 101a is to be determined as being in the high level for producing the digital signal 102 and any portion of the analog signal 101 below the slice level 101a is determined as the low state for producing the digital signal 102. By comparing signals 101 and 102, it is seen that signal 101 contains three separate portions entirely above the slice level 101a that are determined solely as high levels in the digital signal 102, despite the fact that the three wave form portions have a plurality of pulses; the first portion having four pulses, the second portion having four pulses, and the third portion having two pulses. Reasons, referred to above, have caused the distorted analog signal with the low level between such pulses to still be above the slice level 101a, so that they are not detected as respectively four high levels, four high levels and two high levels, but rather only three high levels; the remaining two pulses on the left side of the analog signal 101 and the one pulse on the right side of the signal 101 are correctly interpreted as separate digital pulses of signal 102. A portion or pattern 102a of the digital signal 102 has a period of 30T and falsely has a pulse width of 5T. Therefore it is seen that this false pulse width of 5T within the period 30T can be detected as the delete pattern shown in FIG. 2. That is, the delete pattern of a 5T pulse width with a period of 30T in FIG. 2 matches the false delete pattern 102a shown in FIG. 3 with respect to the digitized signal 102. Therefore, it could be falsely determined that the entire sector should be deleted despite the fact that the sector may contain only valid data and contain no valid delete pattern. This determination may be made upon the delete pulse width, the delete period, the number of delete patterns, or a combination of two or all three of the pulse width, period and the number of patterns. Therefore, there arises the problem that due to various distortions, valid data may be read and detected as a false delete pattern and thereby falsely delete the data of the entire sector.

Figure 1:
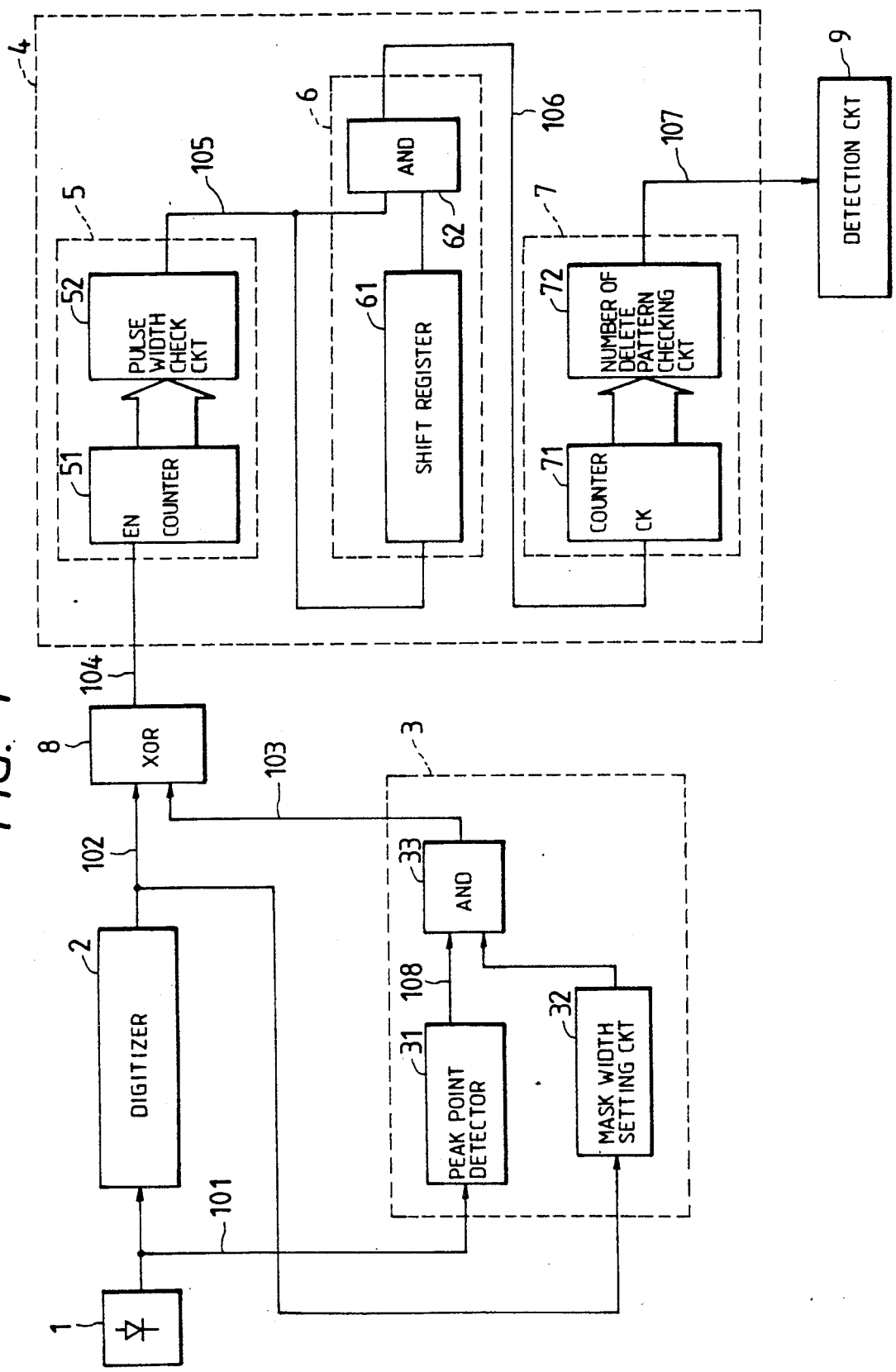
FIG. 1 is a block diagram showing the circuit components of the apparatus according to the present invention.

Apparatus according to the present invention, detects the valid delete state and does not falsely detect the false delete state as shown in FIG. 1. The read head 1 reads the optical disc, particularly the data, and produces an analog output signal 101, which is fed t the digitizer 2, which converts the analog signal 101 into a digital signal 102.

If, which is not the case with the present invention, the digital signal 102 was fed directly, without any change, as the signal 104, there exists the possibility that a false delete pattern could be detected as a valid delete pattern and the valid data of a sector could be determined as being in the delete state as follows. Thus, if the delete pattern detection circuit 4 directly received a digital signal 102, the pattern pulse width detector circuit 5 would detect the delete pattern pulse width 5T in the signal 102 as seen in FIG. 3 (in fact any pulse width of 5T or greater is detected as the delete pulse width) and produce signal 105 consisting of only the pulses having a width of 5T or greater. These pulses in signal 105 would have their pattern period determined by the pattern period detector circuit 6, which period as shown in FIG. 3 for digitized signal 102 is 30T (in fact any portions of pulses in signal 105 that are 30T apart would be detected as the delete period) corresponding to the delete period shown in FIG. 2. The output signal 106 from circuit 6 would have pulses corresponding to the number of delete pattern periods, which number would be countered by the delete pattern number checking circuit 7, and if the number were sufficient high the signal 107 would indicate to the detection circuit 9 that the delete state has been detected falsely and all the data of that sector would be considered invalid, even though it was in fact valid. Thus, without the present invention, the delete pattern of width would be falsely detected, the delete pattern of period would be falsely detected, the delete pattern of number would be falsely detected, and the delete state would be falsely detected.

The apparatus of the present invention will correctly determine the delete pattern as follows. When the above mentioned distortion of the analog signal is present, for example when the resolution degrades, the read signal 101 may have the waveform as shown in FIG. 3, to thereby produce the false delete pattern shown as signal 102 in FIG. 3. However, the peak pulse detection circuit 3 interleaves its output signal 103 with the signal 102 in the OR type, particularly an XOR circuit 8 to produce a combined signal 104 that no longer falsely has a delete pattern.

More specifically, the analog read signal 101 has its peak points detected by the peak point detection circuit 3. Particularly, all the peak points are detected by the peak point detector 31 to provide a digital train of pulses corresponding in number to the number of peaks in the analog signal 101 as an output signal 108. Also, the digital signal 102 is input to the mask width setting circuit 32, which will produce a pulse train of low level pulses, each corresponding to each rise of the digital signal 102, and having a low pulse width of a timing and width sufficient of override in time completing the corresponding peak pulse of the signal 108. The output of circuit 32 and signal 108 are combined in AND circuit 33 to produce the peak pulse signal 103 shown in FIG. 3, which is composed of pulses corresponding to only the pulses other than the first pulse of a group of pulses that extend entirely above the slice level 101a and therefore is based upon the intrinsic data signal. This intrinsic data signal would not be correctly interpreted by the digitizing circuit 2. This peak pulse signal 103 is combined with the digital signal 102 in the XOR circuit 8 to produce the output signal 104 shown in FIG. 3. From a comparison of signals 102 and 103, it is seen that the signal 103 is interleaved with signal 102 to produce a combined signal 104, which includes the intrinsic data pattern of the original signal 101, despite the intrinsic data pattern not being faithfully reproduced in digital signal 102. It can be seen that the digital signal 104, that is the combined or interleaved signal, cannot be interpreted as the delete pattern shown in FIG. 2.

Therefore, according to the present invention, it is seen that a distorted analog read out signal from an optical disc data pattern, having an intrinsic data pattern that is digitized as a false delete pattern, can be correctly analyzed by a delete pattern detection circuit and therefore the validity of the valid data is maintained. This is accomplished by interleaving the peak pulse pattern signal obtained from the analog signal with the digital signal obtained from the digitizing of the analog signal to produced a combined signal that is fed to the delete pattern detection circuit. Therefore, there is obtained the excellent result that the read signal is prevented from being falsely detected as containing a delete pattern, therefore valid data is interpreted as valid data and not as deleted invalid data, to preserve the integrity of the entire sector.

The above described preferred embodiment will be applied to various examples.

With time progressing from left to right in FIGS. 4–8, various patterns of data pits, delete long pits, dust and other problems have been schematically illustrated in the top line with respect to the data portion of a track of an optical disc. In succeeding lines, signals 101, 102, 108, output from circuit 32, 103, 104, level from circuit 52, output from circuit 51, 105, output from circuit 61, 106, level from circuit 72, output from circuit 71, and 107 are illustrated. With respect to the bottom portion of FIGS. 6 and 7, please note that time of the period has been compressed with respect to signal 106, output of circuit 71 and signal 107. For purposes of reference, a period of 30T has been shown with respect to signal 106, at the bottom portion of the diagram to show how it relates to signal 106 with respect to the top portion of the diagram. In all of these figures, a data pit is represented as a circle for the track, a long pit for the delete pattern is represented by a horizontally elongated pit, and dust is represented by a smaller circle within a data pit.

Figure 4:
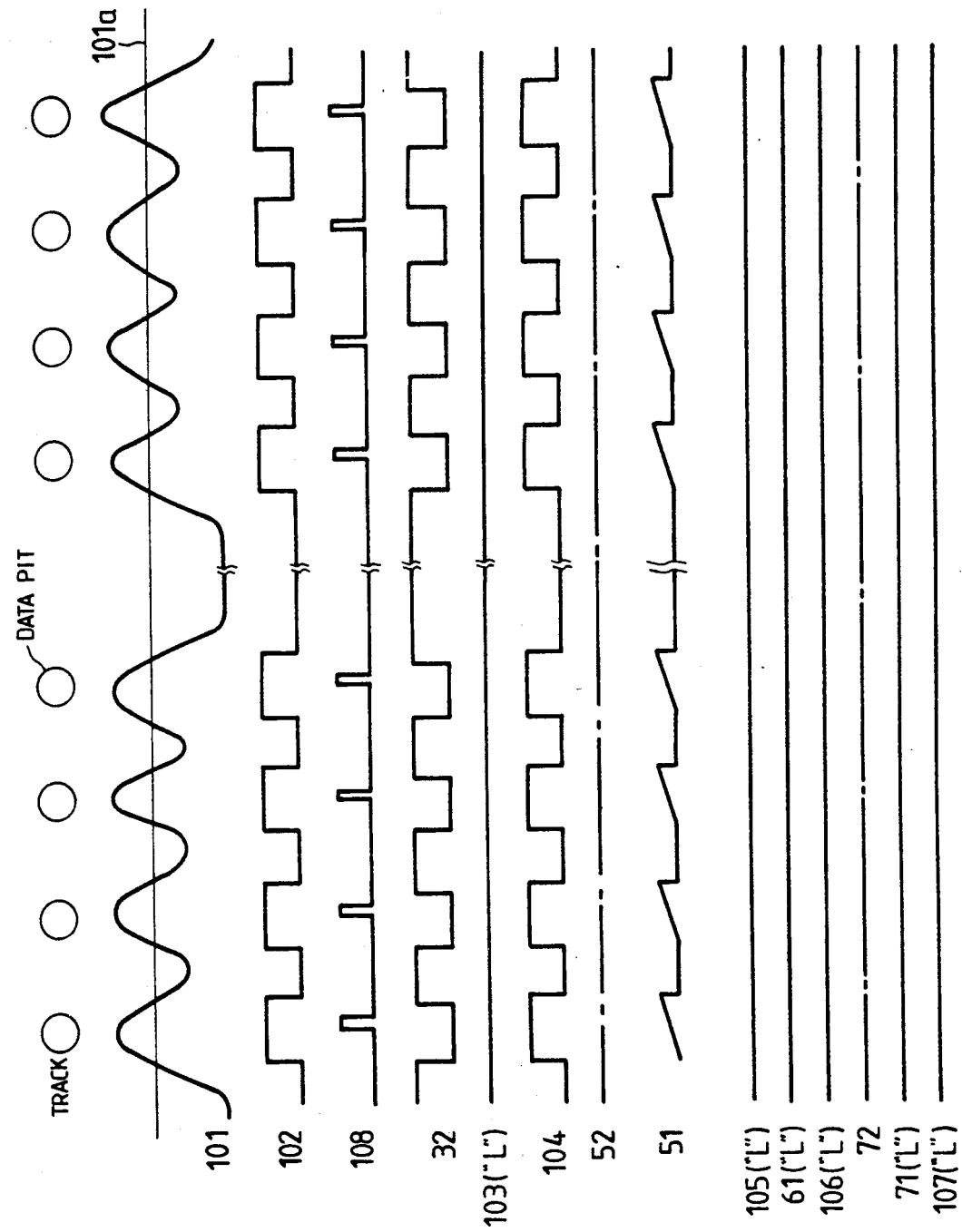
FIG. 4 is a chart showing waveforms according to one example wherein there are only valid data patterns and no data errors.

FIG. 4 represents a situation wherein only valid data is present, that is there is no delete pattern and there are no causes of distortion, such as those involving reflected light caused by dust. Therefore, the analog signal 101 is undistorted and according to the slice level 101a faithfully produces a valid and undistorted digital signal 102 without any false delete patterns. Therefore, all of the peak pulses of signal 108 are effectively masked by the mask signal from 32 to produce only the low level signal 103, so that signal 104 is identical to signal 102. Since none of the pulses in signal 104 are of a width equal to the delete pattern, it is seen that the output 105 from circuit 5 has correctly detected the presence of no delete pattern. More specifically, each pulse of signal 104 is integrated or summed by the counter 51 to produce a rising level in the signal from counter 51, and this rising level never reaches the level set by detector circuit 52. Therefore the following signals are at the low state, that is detecting no delete pulse or delete pattern: 105, output of 61, 106, output of 71, and 107.

Figure 5:
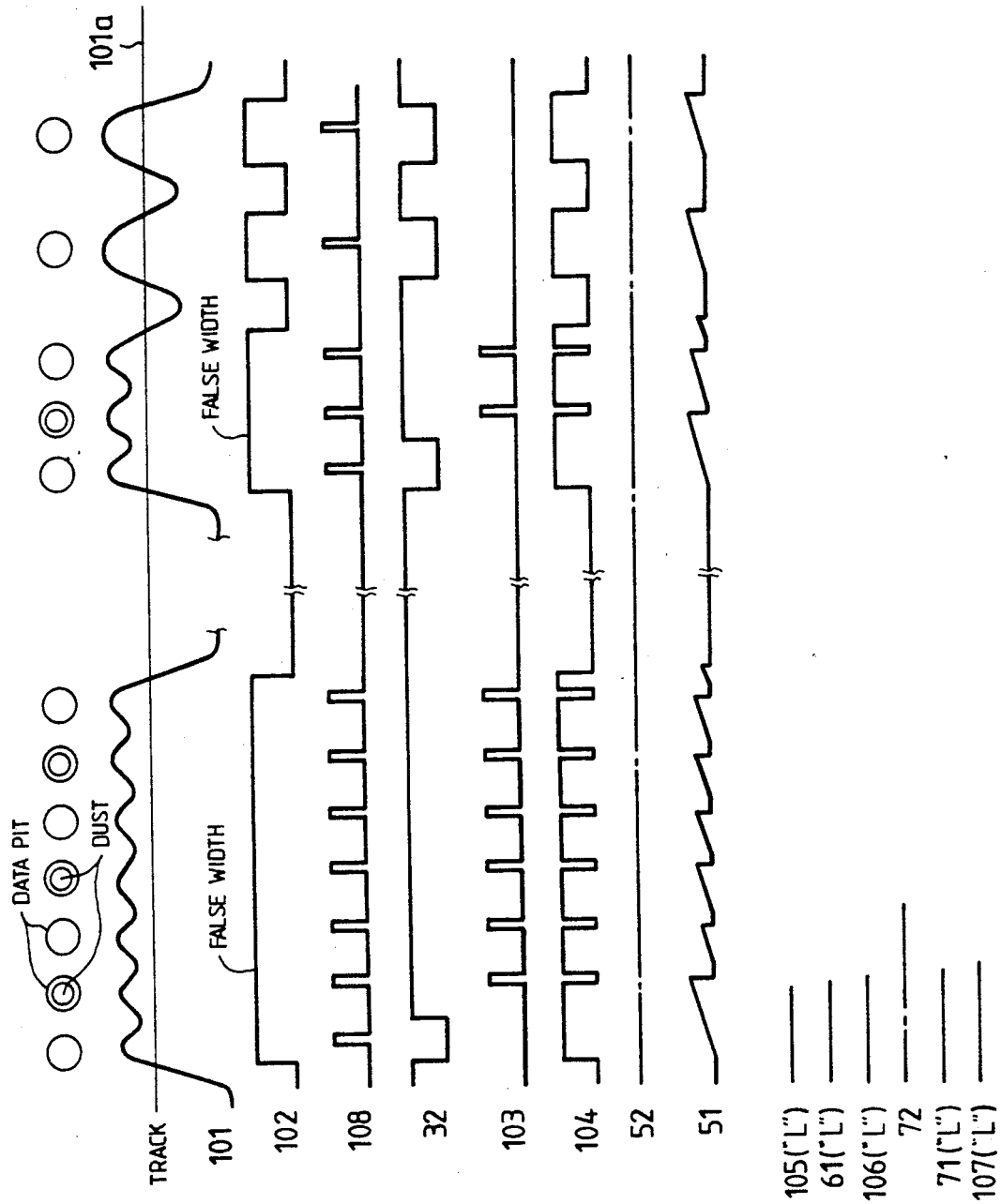
FIG. 5 is a chart of waveforms produced by the apparatus of the present invention with respect to an example wherein there is no valid delete pattern but the presence of data errors that produce a false delete pattern.

In FIG. 5, an example is represented wherein a valid data pattern of pulses, with no valid delete pattern being present, produces a distorted analog signal 101 due to the presence of dust in four of the illustrated data pits. Accordingly, a digital signal 102 has two high pulses of a false width, which could falsely be interpreted as the delete pattern except for the present invention. It is seen that the peak point detection circuit 3 produces the output signal 103 that recovers the intrinsic data pattern lost in the digital signal 102, which is then interleaved with the digital signal 102 to produce the combined signal 104 having the intrinsic data pattern. Therefore the counter or integrator circuit 51 never produces any signal rising above the level set by the detector 52, so that again the remaining signals indicate no delete pattern is detected, with the same result as that obtained in FIG. 1. That is, the present invention has prevented the false detection of a delete pattern in valid data.

Figure 6:
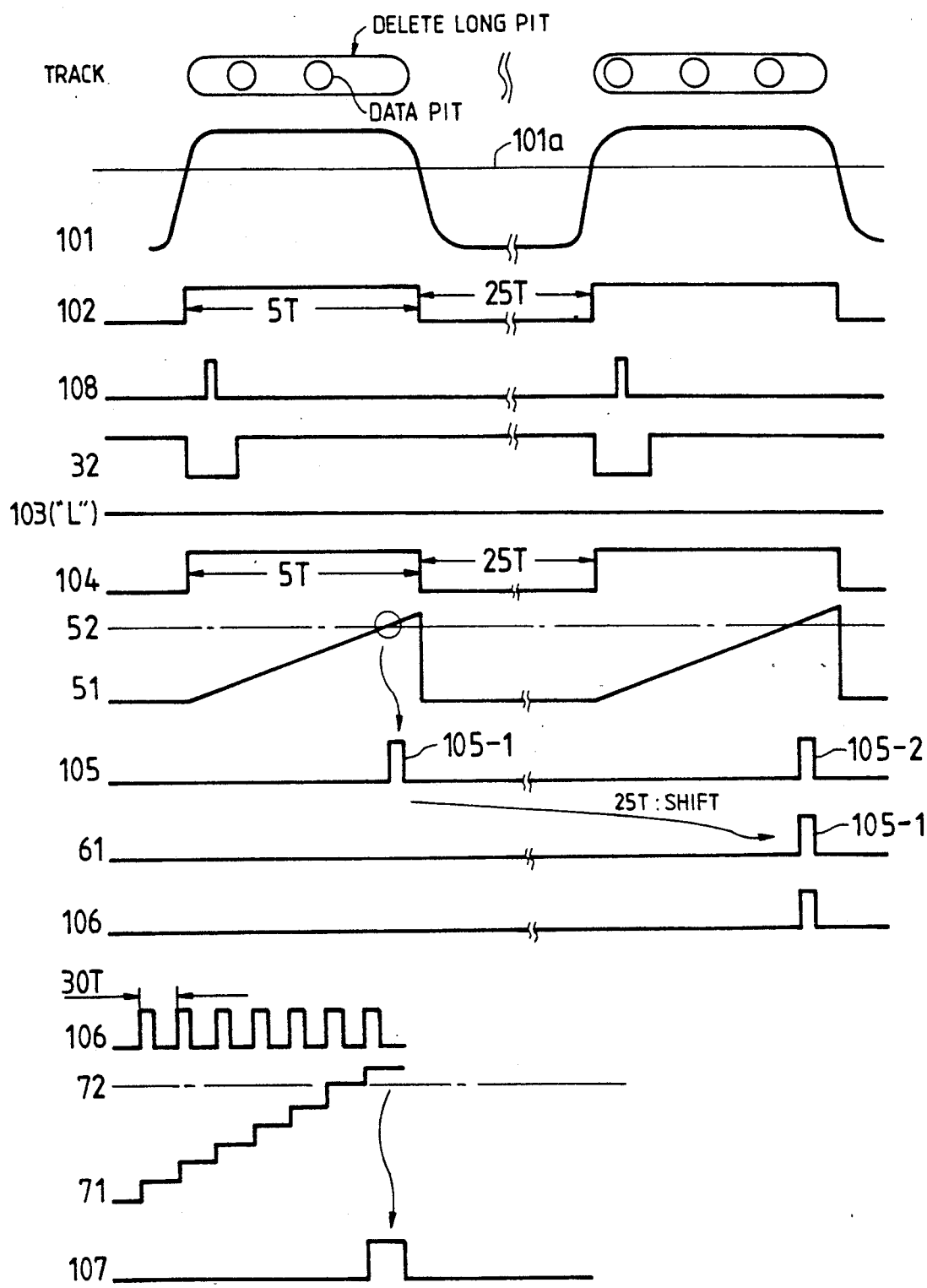
FIG. 6 is a chart of waveforms produced by the apparatus of the present invention with respect to an example wherein there is a valid delete pattern and no errors.

With respect to FIG. 6, there is shown the example of a track containing data pits that have been overwritten with long pits of the delete pattern, and the presence of no causes of distortion, for example the absence of any dust that would cause a distortion of the analog signal. Therefore, a digital signal 102 contains the delete pattern. There has been no intrinsic data lost in obtaining the digital signal 102, so that therefore the peak pulse signal 103 output from the peak point detection circuit 3 is only at the low level, so that signal 104 corresponds exactly to signal 102, so that the valid delete pattern may be correctly detected. It is seen that the counter or integrator 51 produces an output signal that rises above the level set by the detector 52 to thereby provide an output pulse in signal 105 corresponding to each of the high pulses of digital signal 102, 104 that has a pulse width equal to or greater than the delete pulse width corresponding to the level set for the detector 52.

The output signal 105 is fed to both the shift register 61 and the AND circuit 52. The shift register 61 is of a length corresponding to the period of the delete pattern, so that, as seen in FIG. 6, the first pulse 105-1 exits from the shift register 61 the same time that the second pulse 105-2 of signal 105 is received by the AND circuit 62, so that the output signal 106 gains a pulse indicating the presence of one period of the delete pattern. In the lower portion of FIG. 6, having a condensed and distorted low level time, a plurality of the pulses of signal 106 are illustrated close together, although of course the distance between such pulses Would be approximately six times the width of the pulses if signal 106 were not distorted for illustrative purposes. The counter or integration circuit 71 will sum these pulses 106 and when the level within detector 72 is exceeded, the output 107 will be provided with a pulse indicating that the required number of delete patterns is present to indicate the delete state for the entire sector, which of course is correct.

By way of example, the circuit 32 may be a monomultivibrator, and circuits 52 and 72 may be decoders.

Figure 7:
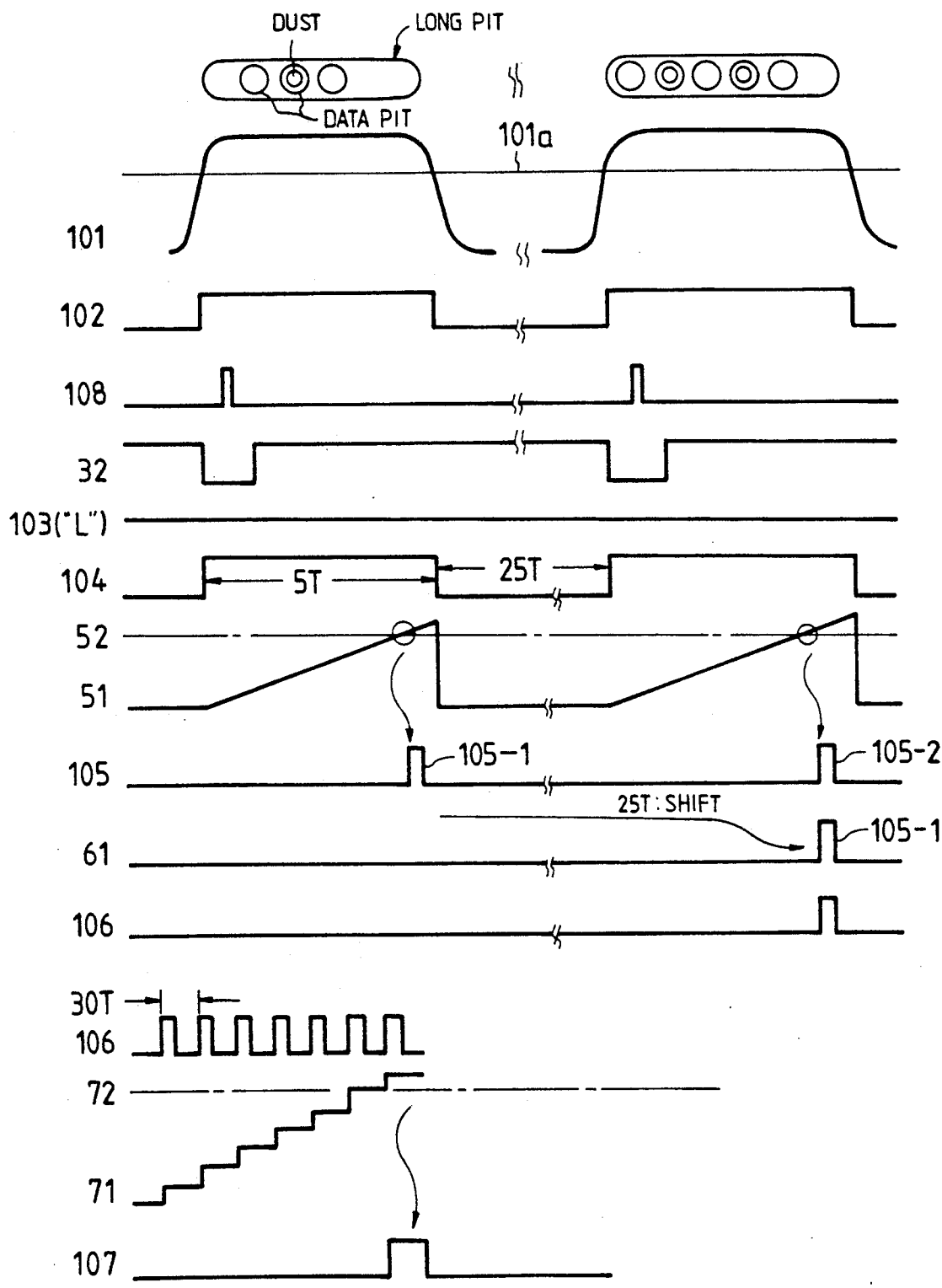
FIG. 7 is a chart of waveforms produced according to the apparatus of the present invention wherein there is a valid delete pattern and error production.

In FIG. 7, there is shown an example wherein the data on the track, as represented, includes data pits, some of which have dust therein, producing analog signal distortion, and an overwritten or superimposed delete pattern comprising, as illustrated, two long pits. The basically undistorted analog signal 101 produces a digitized signal 102 correctly indicating the presence of valid delete patterns. These valid delete patterns are detected as previously described with respect to FIG. 6, and signal 107 correctly indicates the presence of the delete patterns, and more specifically the correct indication of the delete state for the entire sector. The dust within the valid delete pattern may in fact produce some distortion of the analog signal, but would have no effect upon the digital signal 102, and since there are no intrinsic data pulses omitted by the digital signal 102, the entire peak pulse signal 103 is low. There is a possibility that dust. In this illustration may produce some waviness such as would not be interpreted as peak pulses. This may be accomplished with the use of a high pass filter, wherein the intensity of any pulses passing therethrough as caused by dust would not be sufficient to produce any change in the output for signal 103.

Figure 8:
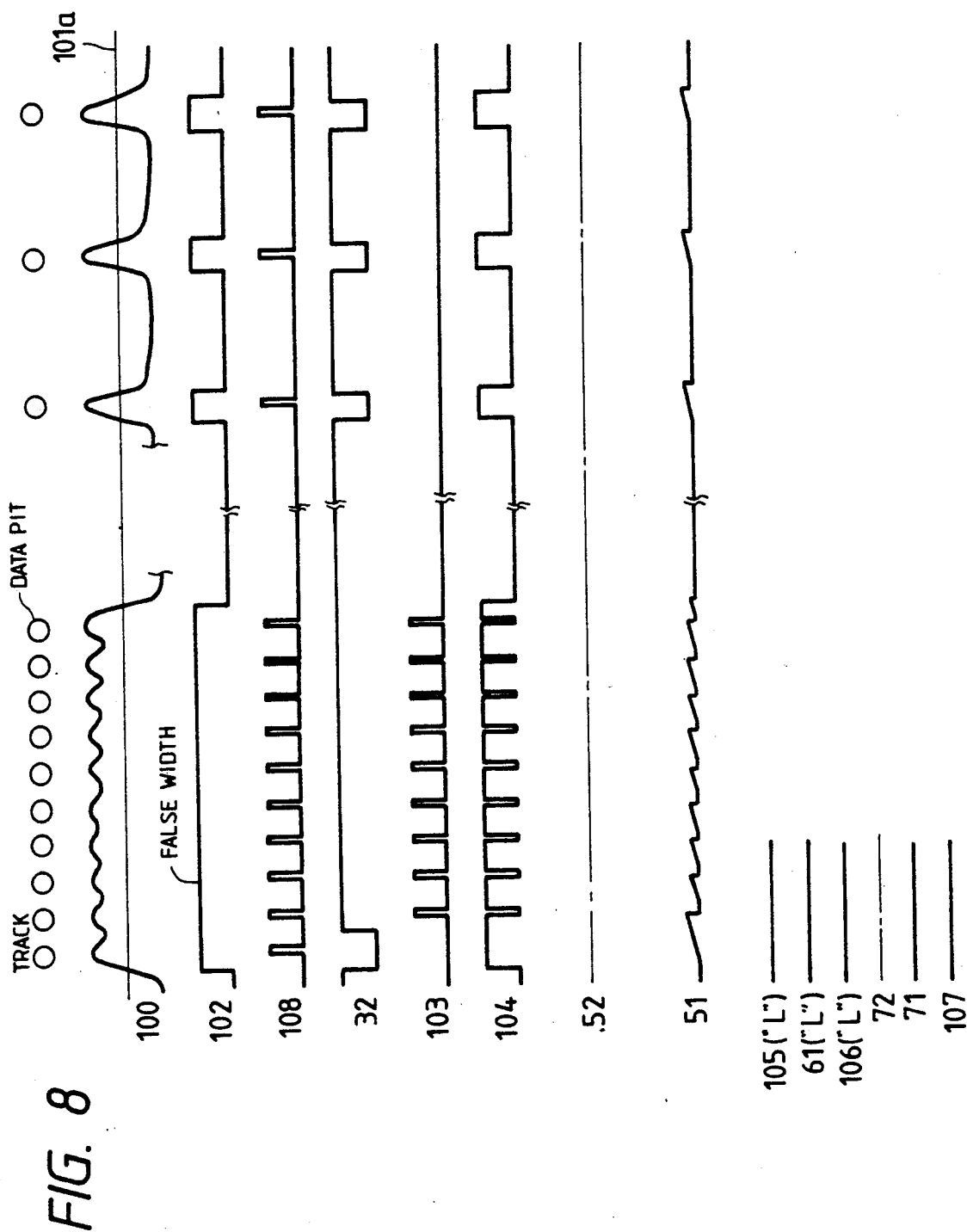
FIG. 8 is a chart of waveforms produced by the apparatus of the present invention according to an example wherein there is no delete pattern and data errors produced by a resolution problem.

FIG. 8 represents a situation wherein valid data pits, representing valid data in the absence of any dust and absence of any valid delete pattern, can produce a false delete pattern for the digital signal 102 due to resolution problems resulting in a distortion of the analog signal, for the left hand portion of the signal 101. Despite this, the intrinsic data signal in the analog signal 101 that has not been reproduced by the digital signal 102 is recovered in the peak pulse signal 103, as previously described, to be interleaved with the digital signal 102 and produce the combined signal 104, which is thereafter correctly interpreted as not including the delete pattern therefore the signal 107 correctly indicates the absence of the delete state of the entire sector.

While a preferred embodiment has been fully described as to its best mode, together with modifications and variations, for the importance of the details and further with respect to specific examples, further embodiments, modifications and variations are contemplated according to the broader aspects of the present invention, all as determined by the spirit and scope of the following claims.

What is claimed is:

1. A circuit for processing an analog read signal from a read head of an optical disc, comprising:
    means for digitizing the analog read signal and providing a digital output signal having pulses, which may include a false delete pattern of pulses having a fixed width due to distortion in the analog signal;
    delete pattern determining circuit means for detecting a delete pattern of pulses having the fixed width among the pulses of the digital output signal;
    means for detecting peak pulses in said analog signal and producing a peak pulse output signal; and
    means responsive to said peak pulse output signal for modifying the width of the false delete pattern of pulses of the digital output signal so that it does not have the fixed width and inputting the thus modified digital output signal to said circuit means.

2. The device of claim 1, wherein said means for detecting peak pulses is further responsive to said digital signal.

3. The device of claim 2, wherein said means for detecting peak pulses masks out peak pulses of said digital signal from said analog signal.

4. The device of claim 1, wherein said means detecting peak pulses includes means for providing a digital signal of pulses corresponding to each peak of the analog signal as a first signal, providing a second digital signal having a pulse for each rising edge of said digital signal, and combining said first and second digital signals to provide said peak pulse output signal.

5. The device of claim 4, wherein said means for digitizing includes means providing a slice level and providing said digital output signal with a high corresponding to that portion of the analog signal exceeding said slice level, so that a degraded analog signal having a plurality of peaks and intermediate valleys above said slice level is falsely read as a single high pulse that may falsely correspond with the width of a delete pattern pulse.

6. The device of claim 1, wherein said means for modifying includes means for interleaving the peak pulse output signal with said digital signal from said means for digitizing to provide an output combined signal fed to said delete pattern determining circuit means.

7. The device of claim 6, wherein said means for digitizing includes means providing a slice level and providing said digital output signal with a high corresponding to that portion of the analog signal exceeding said slice level, so that a degraded analog signal having a plurality of peaks and intermediate valleys above said slice level is falsely read as a single high pulse that may falsely correspond with the width of a delete pattern pulse.

8. The device of claim 1, wherein said means for digitizing includes means providing a slice level and providing said digital output signal with a high corresponding to that portion of the analog signal exceeding said slice level, so that a degraded analog signal having a plurality of peaks and intermediate valleys above said slice level is falsely read as a single high pulse that may falsely correspond with the width of a delete pattern pulse.

9. An apparatus for detecting the delete state of a sector according to delete patterns having a predetermined pattern on a sector of an optical disk to delete data written on the sector, comprising:
    means for producing a read signal from the sector of the optical disk;
    means for digitizing the read signal and producing a corresponding digitized signal;
    first means for detecting peak points of said read signal to generate a corresponding peak pulse signal;
    means for interleaving said peak pulse signal into said digitized signal to produce a combined signal; and
    means for detecting the delete state, including whether or not the delete pattern is correctly overwritten on the sector to be deleted, by checking said combined signal.

10. The apparatus defined in claim 9, wherein said means for detecting the delete state has means to integrate the pulses of said combined signal and a checking circuit means to check the integrated sum value of each pulse ad detecting the delete pattern when the checking circuit means detects that the sum in over a fixed reference value corresponding to the correct pulse width of the delete pattern.

11. The apparatus defined in claim 9, wherein said means for detecting the delete state further comprising delete pattern period detection means for checking the interval between the pulses of said combined signal so that the delete state is detected when the interval of said pulses is over a fixed reference interval corresponding to the period of the delete pattern.

12. The apparatus defined in claim 9, wherein said means for detecting the delete state further comprising means for summing the number of the delete patterns and checking means that detects the delete state when the sum is over a fixed reference value corresponding to the number of the delete patterns to be in the sector to indicate the delete state.

13. The apparatus defined in claim 12, wherein said means for summing includes a counter means to sum the number of the delete patterns.

14. The apparatus defined in claim 10, wherein said means for detecting the delete state further comprising delete pattern period detection means for checking the interval between the pulses of said combined signal so that the delete state is detected when the interval of said pulses is over a fixed reference interval corresponding to the period of the delete pattern.

15. The apparatus defined in claim 14, wherein said means for detecting the delete state further comprising means for summing the number of the delete patterns and checking means that detects the delete state when the sum is over a fixed reference value corresponding to the number of the delete patterns to be in the sector to indicate the delete state.

16. The apparatus defined in claim 15, wherein said means for summing includes a counter means to sum the number of the delete patterns.

17. The apparatus defined in claim 10, wherein said means for detecting the delete state further comprising means for summing the number of the delete patterns and checking means that detects the delete state when the sum is over a fixed reference value corresponding to the number of the delete patterns to be in the sector to indicate the delete state.

18. The apparatus defined in claim 17, wherein said means for summing includes a counter means to sum the number of the delete patterns.

19. The apparatus defined in claim 11, wherein said means for detecting the delete state further comprising means for summing the number of the delete patterns and checking means that detects the delete state when the sum is over a fixed reference value corresponding to the number of the delete patterns to be in the sector to indicate the delete state.

20. The apparatus defined in claim 19, wherein said means for summing includes a counter means to sum the number of the delete patterns.

* * * * *